United States Patent [19]
Eckert

[11] 3,713,858

[45] Jan. 30, 1973

[54] PIGMENT RECOVERY

[75] Inventor: Frank J. Eckert, Marrisville, Pa.

[73] Assignee: Cities Service Company, New York, N.Y.

[22] Filed: Nov. 23, 1970

[21] Appl. No.: 92,326

[52] U.S. Cl. .....................106/291, 106/297, 423/92
[51] Int. Cl. ................................................C09c 1/14
[58] Field of Search ....106/291, 297, 309; 23/68, 69, 23/71; 209/211

[56] References Cited

UNITED STATES PATENTS

| | | | |
|---|---|---|---|
| 2,950,981 | 9/1960 | Miller et al. | 106/194 |
| 2,807,858 | 10/1957 | Livingston | 23/70 |
| 3,472,371 | 10/1969 | Ayerst et al. | 209/2 |

Primary Examiner—Delbert E. Gantz
Assistant Examiner—J. V. Howard
Attorney—J. Richard Geaman

[57] ABSTRACT

Crystal platelets of basic lead carbonate which are suspended in the mother liquor are classified according to size by means of a wet cyclone classifier. An underflow stream is recovered from the wet cyclone classifier and contains crystal platelets having an average diameter within the range of about 10 to about 20 microns. Platelets having an average diameter in this range are especially preferred since they are pearlescent and have a luster and brilliance which equals or excells that of natural pearl essence. An overflow stream is also removed from the wet cyclone classifier and contains crystal platelets having an average diameter of below about 10 microns. These under-size crystals are subjected to a size-enlargement step and are then returned to the cyclone classifier for separation with respect to size.

7 Claims, No Drawings

PIGMENT RECOVERY

BACKGROUND OF THE INVENTION

This invention relates to nacreous or pearlescent pigments. More specifically it relates to basic lead carbonate pigments having luster and brilliance that equals or excells that of natural pearl essence.

The term "pearl essence" refers to a composition prepared from the minute guanine and hypoxanthane crystals which are extracted from the skin and scales of certain fish. This "natural pearl essence" can be incorporated into nitrocellulose or methyl methacrylate to provide artificial pearls or buttons, jewelry, decorative finishes, and the like which resemble real pearls or mother-of-pearl. Since the recovery of natural pearl essence is a lengthy and very costly process, it has in the large part been replaced by synthetically produced pigments such as basic lead carbonate and bismuth oxychloride. All such pigments, whether natural or synthetic, are referred to as "pearlescent" or "nacreous" pigments.

The most popular synthetic pearlescent pigment is basic lead carbonate which is precipitated by passing carbon dioxide gas into an aqueous solution of a basic lead salt which has been formed by reacting lead monoxide, or litharge, with an aqueous solution of an acid, and the term "basic lead salt" as used herein thus refers to a double salt of lead. For instance, reaction of litharge with an aqueous solution of nitric acid produces an aqueous solution of a basic lead salt having the formula:

$$Pb(NO_3)_2 \cdot Pb(OH)_2$$

Reaction of litharge with an aqueous solution of acetic acid produces an aqueous solution of a basic lead salt having the formula:

$$Pb(C_2H_3O_2)_2 \cdot 2Pb(OH)_2$$

Corresponding double salts of lead are produced by reaction of litharge with still other acids. Basic lead salts, therefore, have the general formula:

$$Pb(X)_2 \cdot Pb(OH)_2$$

where X is representative of the anion of the water soluble acid which is reacted with the lead monoxide.

Pearlescent basic lead carbonate crystals consist of $$3PbCO_3 \cdot 2Pb(OH)_2 \text{ or } 2PbCO_3 \cdot Pb(OH)_2$$

or a mixture of both. In precipitating the basic lead carbonate pigment, conditions are established and maintained in an attempt to provide hexagonal crystalline platelets that are characterized by clarity, or transparency, and platelet dimensions that are essential in providing a maximum pearlescent effect. Heretofore, optimum platelet dimensions for a pearlescent basic lead carbonate pigment have been specified as being about 5 to about 50 microns in diameter and about 10 to about 50 millimicrons in thickness. It will be appreciated that these specifications apply to pigments which are a mixture of platelets having widely different diameters and thicknesses within these ranges, rather than being applicable to a number of grades of the pigment wherein the platelet dimensions are relatively uniform in each grade, but significantly different from one grade to the next.

Broad specifications on platelet size have been necessary heretofore since it has not been possible to finely control the rate and extent of the crystal growth of basic lead carbonate, and as a result the crystal platelets which were produced have been characterized by a broad range of diameters and thicknesses. Previous attempts to classify the platelets according to size by means of centrifugal separation have met with failure since the platelets are very fragile and have, therefore, been unavoidably broken up by attritioning during the classification process.

SUMMARY OF THE INVENTION

It is therefore an object of this invention to provide a pearlescent basic lead carbonate pigment of high quality.

Another object of this invention is to improve the quality of pearlescent basic lead carbonate pigments by substantially reducing or eliminating the content of crystal platelets having a diameter below about 10 microns.

Still another object of this invention is to provide a high quality pearlescent basic lead carbonate pigment wherein the average diameter of the particles is within the range of about 10 to about 10 microns.

Other objects and advantages of the invention will become apparent from the following description and the appended claims.

The present invention amounts to an improvement in the art of producing pearlescent basic lead carbonate pigments by reacting carbon dioxide with an aqueous solution of a basic lead salt, and wherein the pigment forms as crystal platelets of basic lead salt suspended in the aqueous reaction medium. Crystallization processes with which the present invention may be employed need not be described in detail herein since they are available from the prior art, e.g., U.S. Pat. Nos. 2,097,269 and 2,950,981.

It has now been determined, that the quality of such pigments is substantially enhanced when the diameter of the basic lead carbonate crystals therein is within the range of about 10 to about 20 microns.

In the aforementioned crystallization processes, conditions can be controlled so that formation of platelets having a diameter in excess of 20 microns is substantially precluded, but in such cases the formation of platelets having a diameter below about 10 microns tends to predominate, so that it becomes very difficult to produce a pigment wherein the average diameter of the platelets is within the preferred range of about 10 to about 20 microns.

In accordance with the present invention, the pearlescent basic lead carbonate pigment is produced while maintaining conditions which substantially preclude formation of crystal platelets having a diameter in excess of about 20 microns, and a stream of the platelets suspended in the aqueous reaction medium is then passed into the inlet of a wet cyclone classifier. An "underflow" stream is recovered from the cyclone and contains basic lead carbonate crystal platelets having an average diameter within the range of about 10 to about 20 microns. The underflow stream thus contains pigment particles of a highly desirable size and it is therefore regarded as the product stream. An "overflow" is also recovered from the cyclone and contains crystal platelets having an average diameter below about 10 microns. Since these particles are undesirably small, the overflow stream is regarded as the reject stream from the cyclone, but this stream is not wasted. The crystal platelets in the overflow stream are instead increased in size by further reaction of basic lead salt with carbon dioxide in their presence. After this enlargement of the crystals, they are recirculated back to the cyclone wherein they are once again subjected to classification for separation of product and reject fractions.

In one advantageous embodiment of the invention, the stream that is passed into the inlet of the cyclone is continuously removed from the reaction vessel during production of the crystal platelets while the overflow stream is being recirculated back to the reaction vessel. The product stream can thus be continuously withdrawn from the cyclone while the under-size crystals are continuously being returned to the reaction vessel for enlargement therein. Accordingly, the product stream contains platelets having a particularly desirable diameter, while at the same time the smaller and less desirable particles are enlarged in size so that they can also be eventually recovered in the product stream.

DETAILED DESCRIPTION OF THE INVENTION

The term "cyclone classifier" as used herein is classical in the sense that it refers to a device into which a stream of particles suspended in a liquid is injected tangentially and is therein transformed into a vortex. Wet cyclone classifiers are described in detail on page 21–54 of *Chemical Engineer's Handbook*, fourth edition. During operation coarser particles in the feedstream travel down the walls of the steeply sided cone section of the cyclone and are removed in a partially dewatered form at the apex thereof. At the apex, the direction of flow of the liquid stream reverses itself with respect to the longitudinal axis of the classification chamber and flows to the overflow outlet at the opposite end of the chamber. In the present invention, therefore, the product stream is removed from the apex of the cyclone while the smaller, less desirable platelets remain in the liquid stream and are discharged from the cyclone in the overflow.

The size of the cyclone classifier which can be employed in the present invention is subject to variation and depends mainly upon the volume of the liquid stream which must be processed to achieve a given production rate. The velocity at which the liquid stream should be introduced into the cyclone is dependent to some extent upon the design thereof but satisfactory results are generally obtained with an inlet velocity which is somewhere within the range of about 20 to about 40 feet per second. The most efficient classification of the crystal platelets is usually effected by means of an inlet velocity of about 25 to about 35 feet per second. The concentration of basic lead carbonate in the feedstream to the cyclone is variable and depends upon the process conditions employed in the crystallization process. Generally the concentration of crystals in the feedstream will be somewhere within the range of about 0.1 to about 5 weight percent and more preferably should be within the range of about 0.5 to about 3.0 weight percent. Where preferred, more than one cyclone can be employed for classification of the crystals. In such a case, the overflow stream from one cyclone can be passed into the inlet of another cyclone from which an overflow and an underflow stream is discharged.

As previously indicated, the liquid stream that is removed from the apex of the cyclone is referred to as the "underflow" or product stream while the other stream that is removed from the other end of the cyclone is referred to as the "overflow" or the reject stream. The proportion of underflow to overflow is variable by regulation of the outlet sizes of the cyclone, the operating pressure, and the like. In accordance with the present process, the volume ratio of underflow to overflow can be within the range of about 5/1 to about 14/1, respectively, and more preferably can be within the range of about 8/1 to about 12/1.

In a process for producing pearlescent basic lead carbonate, the crystal platelets can be produced in a batch process wherein the crystals are grown over a period of several hours by bubbling carbon dioxide through an aqueous solution of basic lead salt. In accordance with the present invention, the batched-produced crystals, in the mother liquor, can then be passed through the cyclone for recovery of a product stream while passing the reject stream to another reaction tank. More basic lead salt, and water if necessary, is also added to this tank and carbon dioxide is then bubbled through the resulting mixture for reaction with the basic lead salt, thus effecting further growth and enlargement of the small, reject crystals. Thereafter, the crystals are again passed through the cyclone for recovery of a product stream and the reject stream may once again be treated for enlargement of the undersize crystals therein.

In another embodiment of the invention, the process may be made substantially continuous by recirculation of the recycle stream to the crystallization tank while a make-up solution of basic lead salt and carbon dioxide gas is continuously added thereto. In such a case, continuous recovery of a product stream is effected while reject crystals are being enlarged and new crystals are being formed coextensively.

It will be appreciated that the product stream which is recovered from the cyclone can be relatively large in proportion to the reject stream and in such a case will contain the bulk of the liquid which is discharged from the cyclone. The pigment in the product stream can be finally recovered from this liquid by conventional means, e.g., centrifugation, or drying by means of alcohols, ketones, acetates, esters, or the like.

Because of the continuous recirculation which exists in the continuous process described above, the liquid phase of the product stream will contain an amount of unreacted basic lead salt which is in excess of that which normally exists at the cut-off of the reaction in a batch operation, i.e., when the reaction can not be held above a pH of about 6.5. Therefore, the product stream can, to advantage, be subjected to continuous centrifugation for separation of the pigment from the bulk of the liquid in the stream and the separated liquid can then be returned to the reaction vessel for conversion of the lead salt therein to basic lead carbonate crystals.

EXAMPLE

Lead monoxide was dissolved in an aqueous solution of propionic acid to provide a basic lead salt solution containing 6.1 weight percent of lead. This solution was allowed to settle overnight and the next morning the clear supernatent solution was drained off into another tank.

The basic lead salt solution was then slowly fed into still another tank which contained 30 gallons of water at start-up. The feeding of carbon dioxide gas into the solution was also commenced, and at the same time a stream of the solution was pumped from the tank into a 1⅛ inch diameter (maximum) cyclone classifier at 40 psig and at the rate of 1.44 gallons per minute. This provided an inlet velocity at the cyclone of about 30 feet per second. The cyclone had an underflow orifice of 0.125 inches in diameter and an overflow orifice of 0.125 inch in diameter. A product stream was removed from the cyclone at the rate of 1.31 gallons per minute while the reject stream was discharged therefrom at the rate of 0.13 gallon per minute. The reject stream was continuously circulated back to the crystallization tank while the product stream was passed to a continuous centrifuge. A paste was removed from the centrifuge which consisted of basic lead carbonate crystals containing less than about 5 weight percent of moisture. Liquid which was separated from the crystals by the centrifuge was continuously recycled back to the crystallization tank.

The liquid level within the crystallization tank was maintained substantially constant by adding basic lead salt solution while regulating the feedrate of the carbon dioxide stream to maintaining the pH of the aqueous crystallization medium within the range of about 6.8 to about 7.3. The reaction in the tank was maintained at about 25°C while agitating the mixture by means of a stirrer. The crystallization-separation procedure was carried out continuously for a period of eight hours.

The paste of basic lead carbonate crystal platelets recovered from the centrifuge was suitable, per se, for marketing as a high quality basic lead carbonate pearlescent pigment product. Microscopic examination of the product revealed highly regular hexagonal platelets of basic lead carbonate which has an average diameter of about 13 microns; and, most surprisingly, it was discovered that the crystals were not chipped, fragmented, or rendered irregular by repeated passage through the cyclone classifier. On the other hand, the crystal platelets in the reject stream were found to have an average diameter of only about 8 microns. As previously indicated, a basic lead carbonate pigment wherein the average size of the platelets is below about 10 microns is an inferior pigment.

While the present invention has been described with reference to specific conditions, proportions, temperatures, process steps, and the like, it will be understood that still other embodiments will become apparent which are within the spirit and scope of the invention which is defined in the appended claims.

Therefore, what is claimed is:

1. In a process for producing a pearlescent basic lead carbonate pigment by reacting carbon dioxide with a basic lead salt in aqueous solution, and wherein the pigment forms as crystal platelets of basic lead carbonate suspended in he aqueous crystallization medium, a continuous method which comprises:
   a. continuously introducing a basic lead salt solution and carbon dioxide into a reactor vessel and forming said crystal platelets in said medium while maintaining conditions in said vessel which substantially preclude formation of crystal platelets having a diameter in excess of about 20 microns,
   b. passing a stream of the resulting crystal platelets suspended in said aqueous medium from the reactor vessel into the inlet of a wet cyclone classifier during step (a),
   c. recovering an underflow stream from said classifier as a product stream which contains basic lead carbonate crystal platelets having an average diameter within the range of about 10 to about 20 microns, centrifuging the underflow stream, thus recovering the crystal platelets therein, and recirculating the resulting liquid fraction therefrom back to said reaction vessel,
   d. discharging an overflow stream from said classifier which contains basic lead carbonate crystal platelets having an average diameter below about 10 microns,
   e. recirculating said overflow stream back to the reaction vessel during crystallization of basic lead carbonate therein and increasing the size of said crystals in said overflow streams by further reaction of basic lead salt with carbon dioxide in the presence of the crystals while contained in the reaction vessel, and
   f. recirculating the enlarged crystal platelets produced in step e to the inlet of said classifier in the stream of step (b) and continuously recovering crystals having an average diameter within the range of about 10 to 20 microns in the underflow product streams from the classifier while the overflow therefrom is continuously recirculated back to the reaction vessel.

2. The process as defined in claim 1 wherein the overflow stream from the cyclone is passed into the inlet of at least one other cyclone from which an underflow stream is recovered and from which an overflow stream is discharged.

3. The process as defined in claim 1 wherein the entering velocity of the feedstream to said cyclone is within the rang of about 20 to about 40 feet per second.

4. The process as defined in claim 1 wherein the entering velocity of the feedstream to said cyclone is within the range of about 25 to about 35 feet per second.

5. The process as defined in claim 1 wherein the content of said crystal platelets in the feedstream to said cyclone is within the range of about 0.1 to about 5 weight percent.

6. The process as defined in claim 1 wherein the volume ratio of underflow to overflow from said cyclone is within the range of about 5/1 to about 14/1.

7. The process as defined in claim 1 wherein the volume ratio of underflow to overflow from said cyclone is within the range of about 8/1 to about 12/1.

* * * * *